United States Patent
Brooks et al.

(10) Patent No.: US 7,283,318 B2
(45) Date of Patent: Oct. 16, 2007

(54) POSITION SENSOR

(75) Inventors: Ted A. Brooks, Emmett, ID (US);
Leslie G. Christie, Jr., Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 114 days.

(21) Appl. No.: 10/877,641

(22) Filed: Jun. 24, 2004

(65) Prior Publication Data

US 2005/0286153 A1    Dec. 29, 2005

(51) Int. Cl.
G11B 15/18 (2006.01)
G11B 21/02 (2006.01)
G11B 21/24 (2006.01)
G11B 15/46 (2006.01)

(52) U.S. Cl. .................. 360/69; 360/75; 360/291.1
(58) Field of Classification Search .............. None
See application file for complete search history.

(56) References Cited

U.S. PATENT DOCUMENTS

| | | | |
|---|---|---|---|
| 3,649,030 A * | 3/1972 | Ban ..................... 360/78.02 |
| 6,359,751 B1 * | 3/2002 | Groel et al. ............. 360/128 |
| 6,813,112 B2 * | 11/2004 | Chliwnyj et al. ....... 360/77.12 |
| 2002/0080530 A1 * | 6/2002 | Inoguchi et al. ......... 360/261.1 |
| 2004/0090697 A1 * | 5/2004 | Reiners ................... 360/75 |

FOREIGN PATENT DOCUMENTS

EP        488760 A2 *    6/1992

* cited by examiner

*Primary Examiner*—William R. Korzuch
*Assistant Examiner*—Jason Olson

(57) ABSTRACT

In one embodiment, a load position sensor for a tape drive includes a tape cartridge loading mechanism, a head movable in response to movement in the loading mechanism, and a sensor operatively coupled to the head for sensing a position of the head.

10 Claims, 17 Drawing Sheets

POSITION SENSOR

BACKGROUND

A widely used medium for storing data is magnetic tape. Tape cartridges are one of the most popular formats for storing data on tape. Two widely used tape cartridges are the dual reel cartridge and the single supply reel cartridge. In a dual reel tape cartridge, both the supply reel and the take-up reel are housed in the cartridge. In a single supply reel tape cartridge, the take-up reel is built into the tape drive along with an automatic tape threading mechanism. Tape drives often use several sensors to sense the position of the cartridge as it is loaded into the drive. The information from the sensors allows the tape drive controller to monitor cartridge loading.

DRAWINGS

DESCRIPTION

Embodiments of the new load position sensor were developed in an effort to reduce the number of sensors needed to effectively monitor loading a tape cartridge into a tape drive. Embodiments of the sensor will be described with reference to a single reel type tape drive. Embodiments of the sensor, however, are not limited to use in single reel drives but may be implemented in other embodiments, such as other tape drives or other recording devices.

Figure 1:
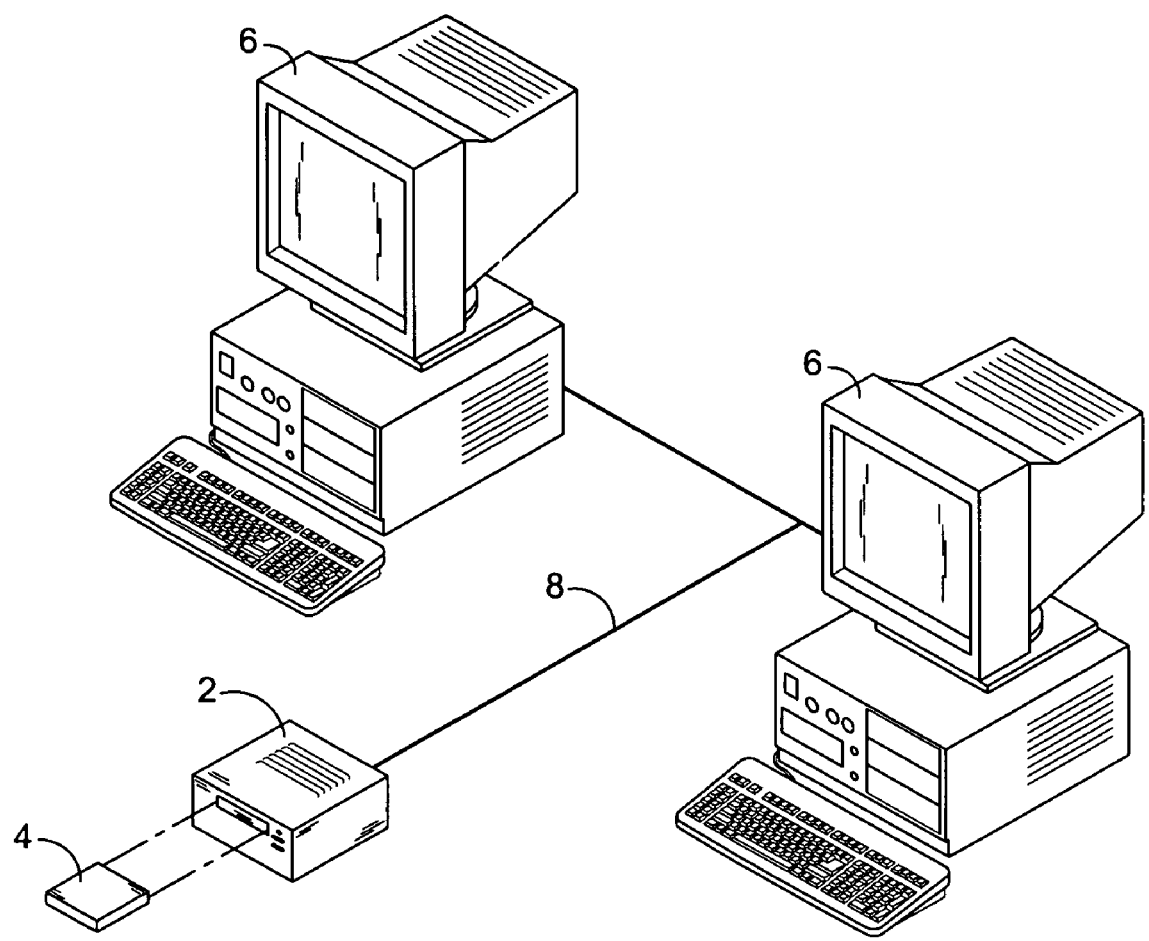
FIG. 1 shows computers networked to a tape drive.
Figure 2:
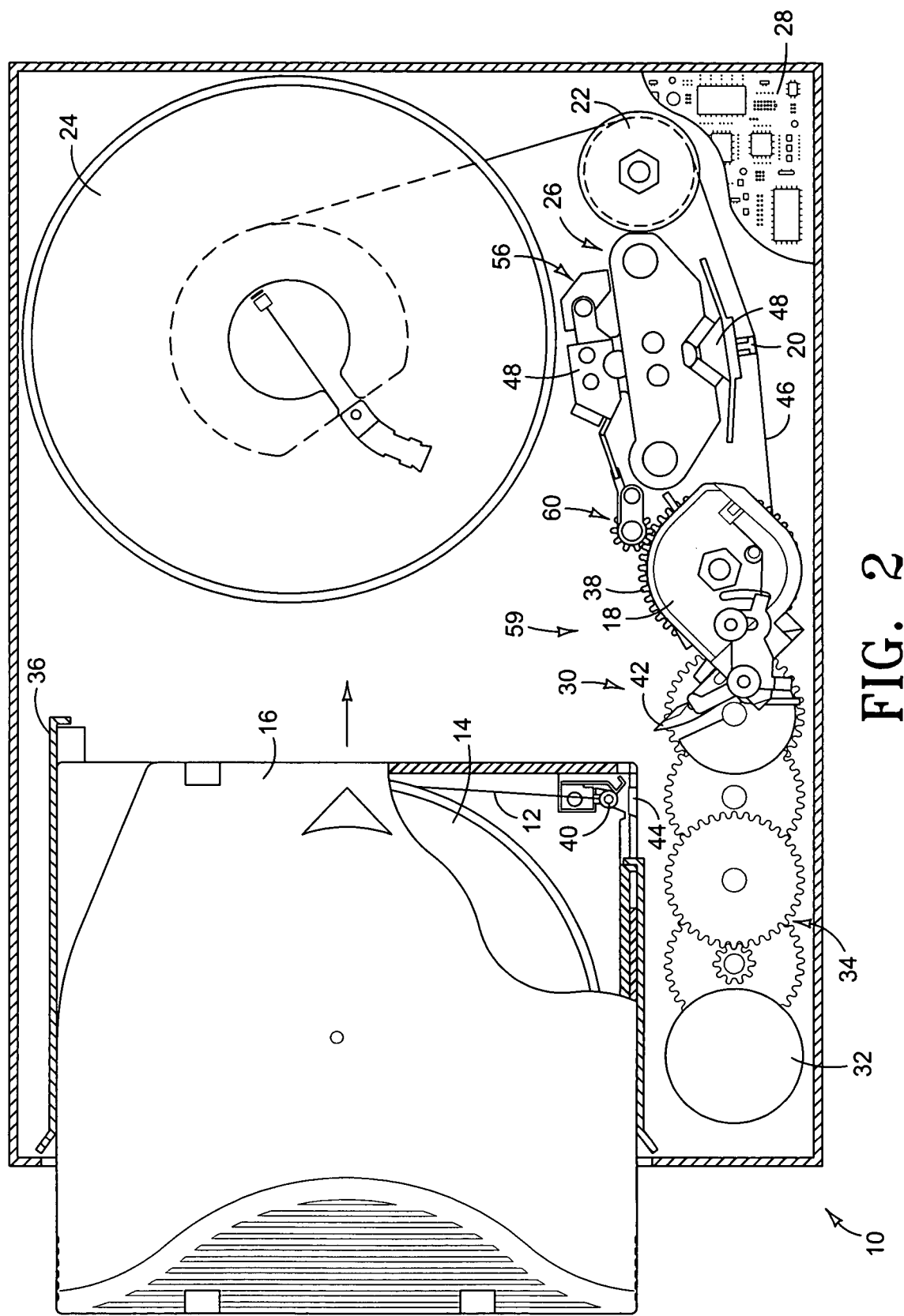
FIG. 2 is a plan view illustrating a tape drive that includes a new load position sensor according to one embodiment with a tape cartridge partially loaded into the drive.
Figure 3:
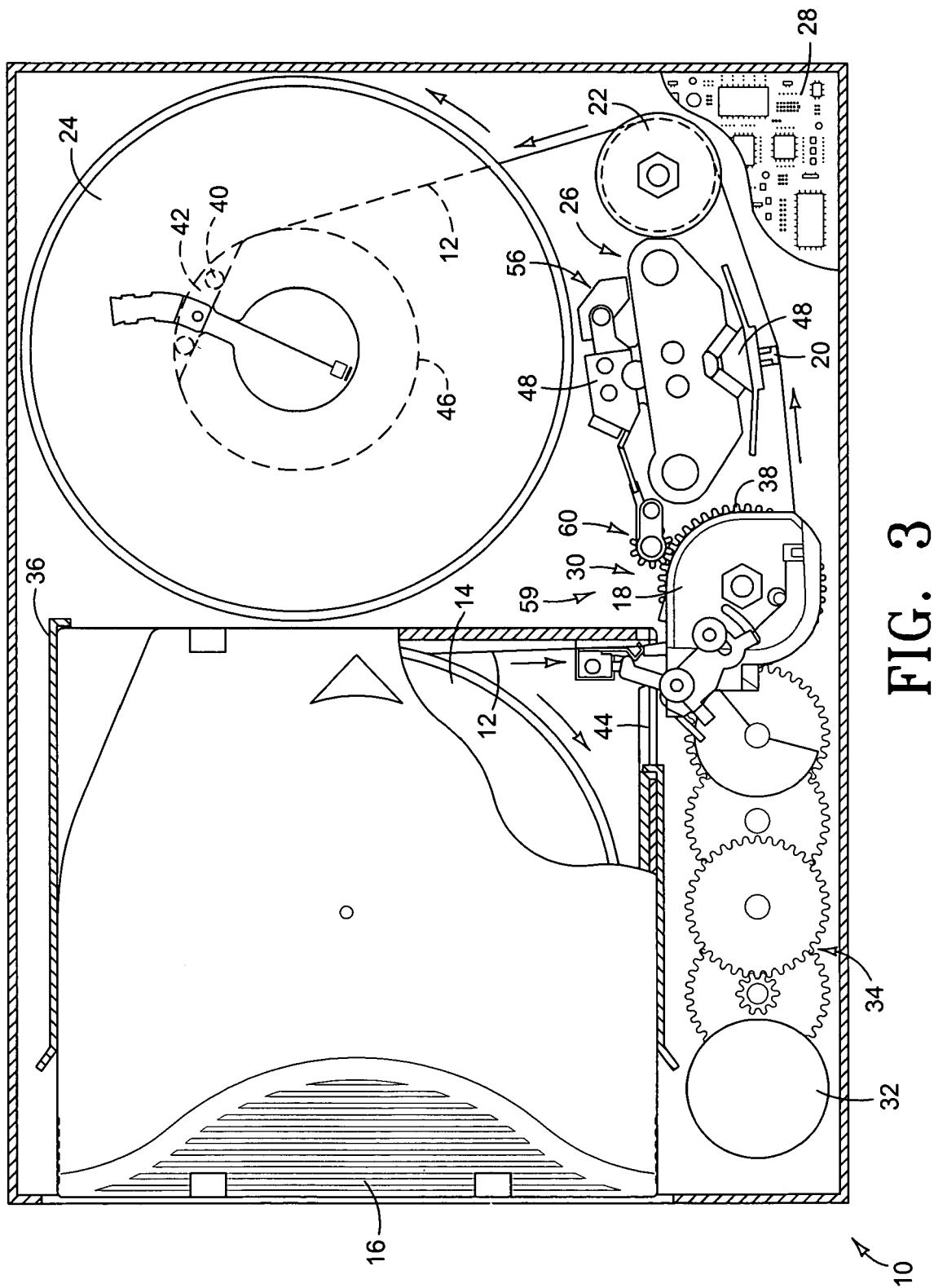
FIG. 3 is a plan view of the tape drive of FIG. 2 showing the cartridge fully loaded into the drive.

FIG. 1 illustrates a tape drive 2 with a removable tape cartridge 4 networked to computers 6 through a wired or wireless link 8. FIGS. 2 and 3 illustrate a single reel drive 10 such as might be used as tape drive 2 in the network of FIG. 1. In tape drive 10 in FIGS. 2 and 3, magnetic tape 12 is wound on supply reel 14 inside removable cartridge 16. FIG. 2 shows cartridge 16 partially loaded into drive 10. FIG. 3 shows cartridge 16 fully loaded into drive 10. When cartridge 16 is fully loaded into drive 10, as shown in FIG. 3, tape 12 passes through a threading unit 18, over head 20, around guide 22, to take up reel 24.

Head 20 typically contains an array of elements that read and record information on tape 12. A "head" or "head element" as used in this document means a transducer that converts an electrical signal to the form required to record the signal to a medium (a write element), or reads a signal from a medium and converts it to an electrical signal (a read element), or both. Tape drives typically use magnetic head elements, where an electrical signal drives a time-varying magnetic field that magnetizes spots, or domains, on the surface of the magnetic tape. A CD-ROM drive typically uses an optical head, where an electrical signal drives a laser that varies the reflectivity of an optical medium. Head 20 is mounted to an actuator 26 which moves head 20 across the width of tape 12. An electronic controller 28 receives read and write instructions and data from a computer 6 (FIG. 1) or other host device. Controller 28, which may include more than one controller unit, includes the programming, processor(s) and associated memory and electronic circuitry necessary to control actuator 26, head 20 and the other operative components of tape drive 10. As actuator 26 carries head 20 back and forth across the width of tape 12, controller 28 selectively activates the head elements to read or record data on tape 12 according to instructions received from the host device.

Figure 4:
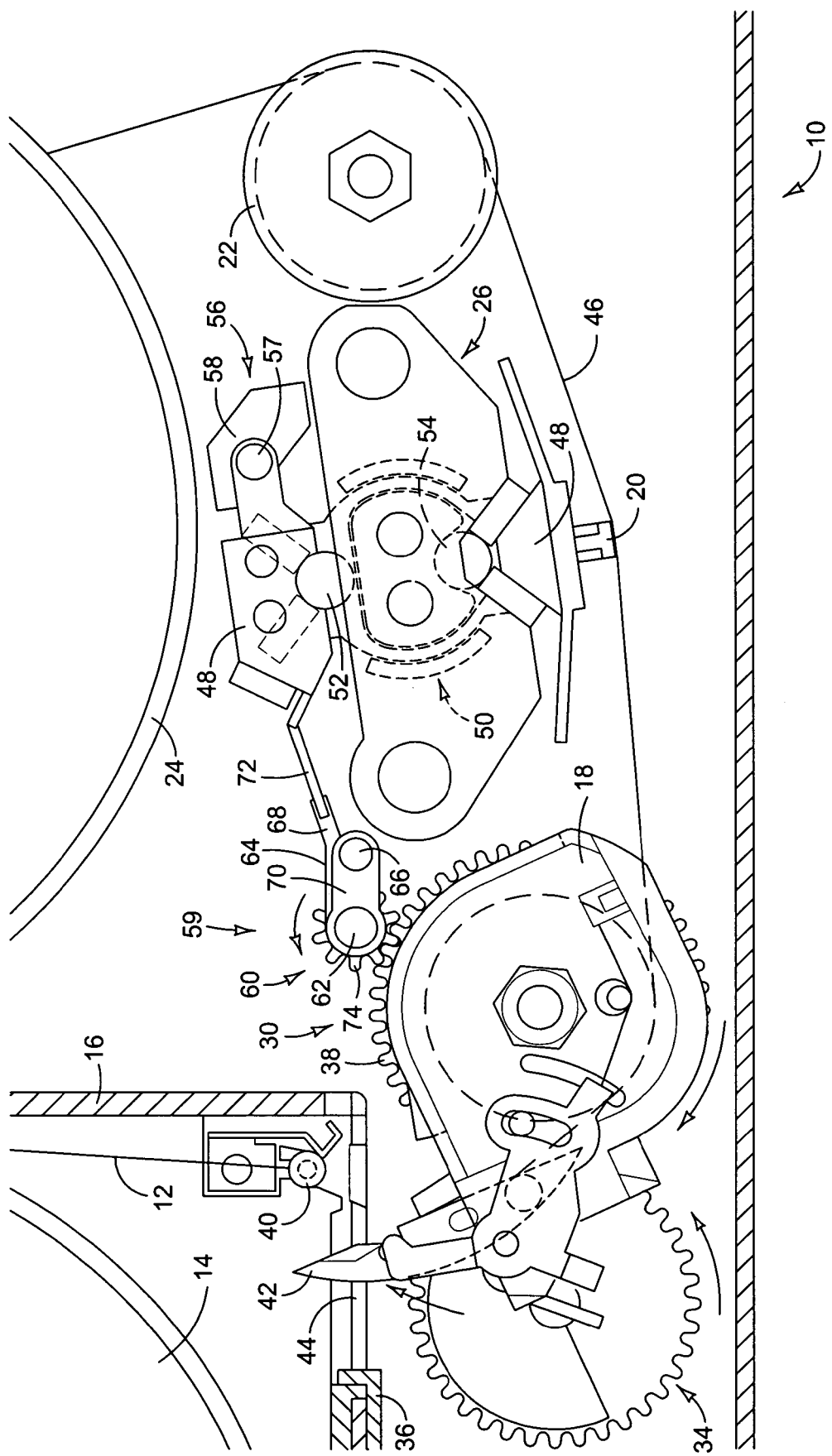
FIGS. 4-7 are more detailed plan views showing, in sequence, operation of the tape grabber and threading mechanism of the tape drive of FIG. 2.
Figure 5:
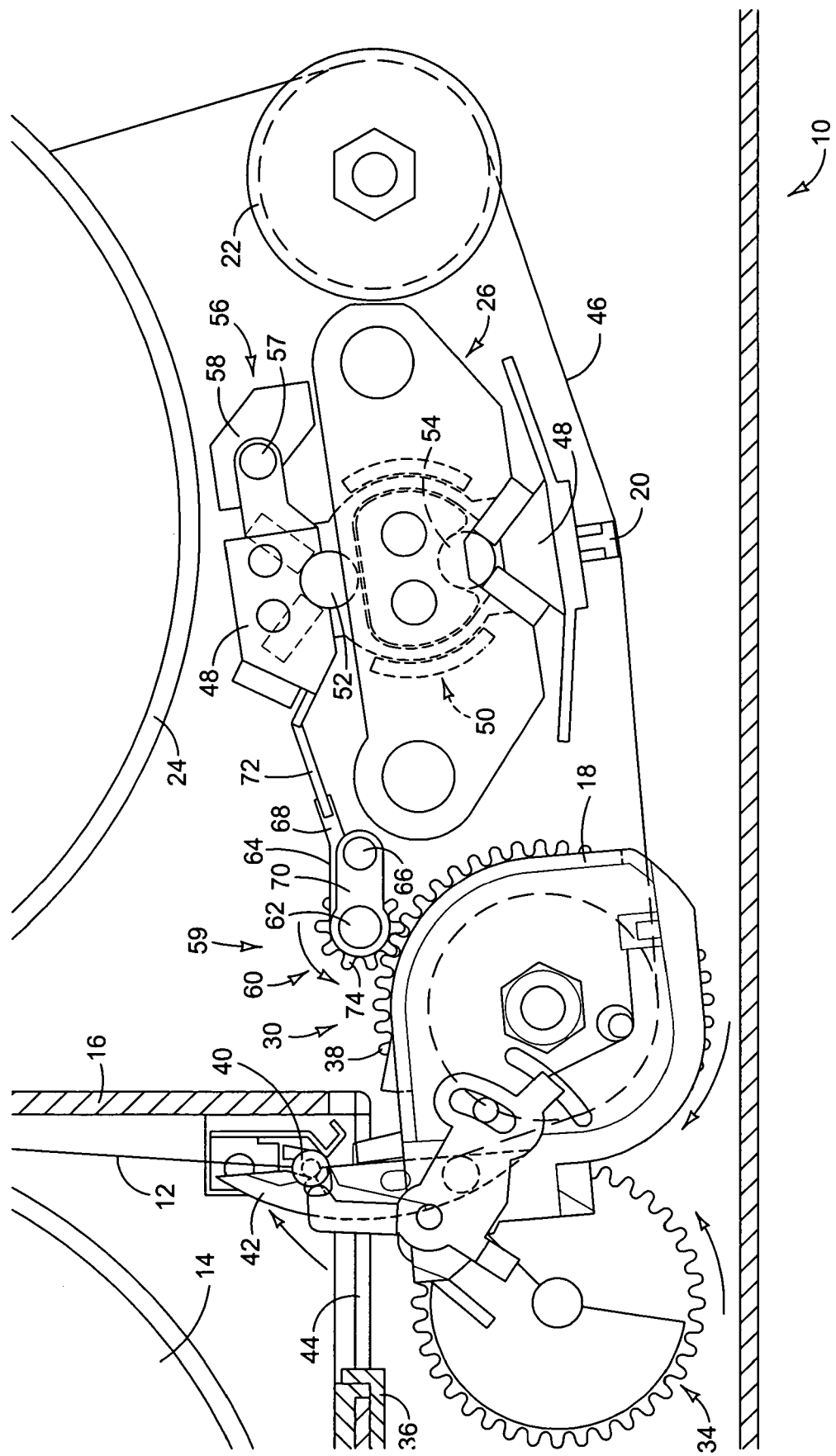
Figure 6:
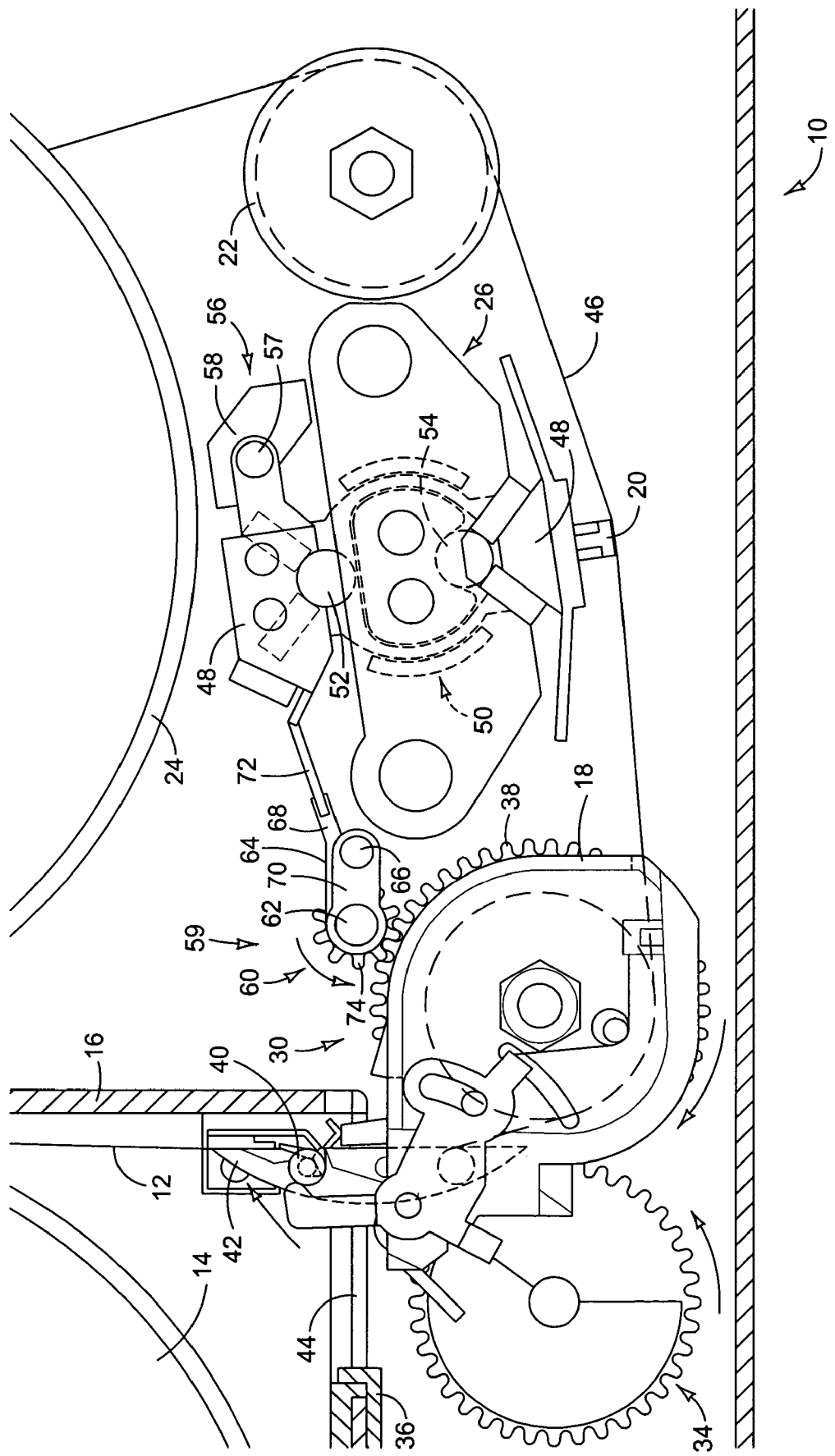
Figure 7:
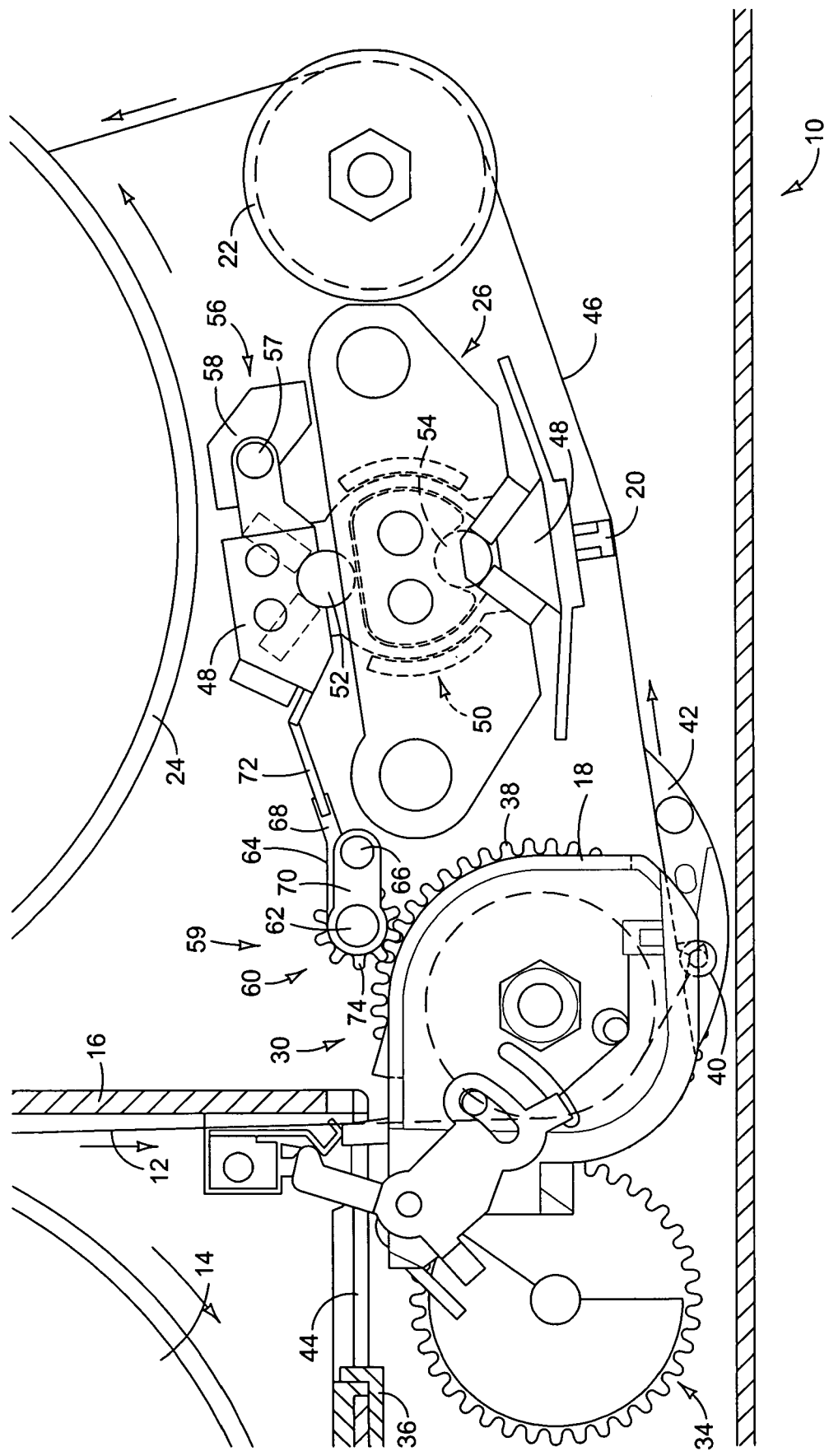

Tape threading unit 18, which is sometimes also referred to as a pin grabber, is one component of a loading mechanism 30 that also includes a load motor 32, a drive train 34 and a cartridge tray 36. A grabber gear 38 is mounted to the bottom of grabber 18. When a tape cartridge 16 is inserted into tray 36, controller 28 energizes load motor 32 to move, through drive train 34, tray 36 along with cartridge 16 into position next to grabber 18. Motor 32 also drives grabber gear 38, through drive train 34, to rotate grabber 18 into cartridge 16 to capture a pin 40 on the end of tape 12 inside cartridge 16. Tape 12 is then threaded past head 20 to take-up reel 24. The capture and threading operation is illustrated in the detail views of FIGS. 4-7. After tray 36 along with cartridge 16 is fully loaded, the continued rotation of grabber 18 moves a half-moon shaped capture part 42 on grabber 18 into an access window 44 on cartridge 16 to capture pin 40, as shown in FIGS. 4, 5 and 6. Capture part 42 is attached to the end of a leader 46 connected to take-up reel 24. Once pin 40 is captured, as shown in FIG. 6, then controller 28 stops load motor 32 and energizes a take-up reel motor (not shown) to rotate take-up reel 24 counter-clockwise. The rotating take-up reel winds leader 46, capture part 42 and tape 12 onto take-up reel 24, as shown in FIGS. 3 and 7. While the structure and operation of the components of tape loading mechanism 30 are well known to those skilled in the art, and therefore they are not shown or described in complete detail, a basic description of loading mechanism 30 is helpful to understanding the operation of the embodiments of a load position sensor described below.

Figure 8:
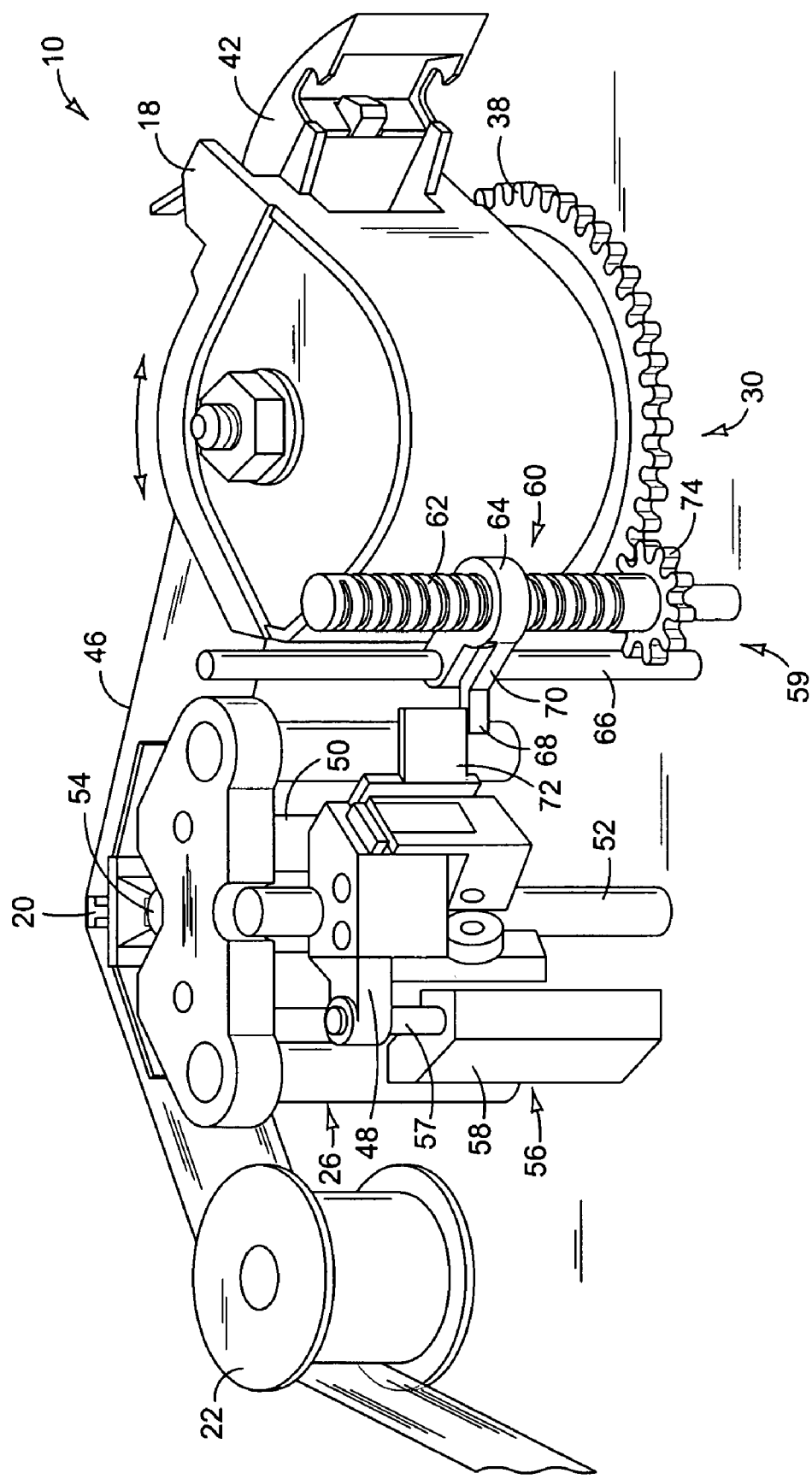
FIG. 8 is a perspective view showing in more detail one embodiment of a load position sensor such as the one shown in FIGS. 2-7.

Referring to FIGS. 2-8, actuator 26 includes a carriage 48 carrying head 20 and a voice coil motor 50 that moves carriage 48 up and down along guide rods 52 and 54. As best seen in FIG. 8, a position sensor 56 is operatively coupled to head carriage 48. "Sensor" as used in this document refers to anything capable of sensing, detecting or determining a target characteristic. Position sensor 56, therefore, represents generally anything capable of sensing, detecting or determining the position of head 20, directly, or indirectly, for example, by sensing the position of head carriage 48. In the embodiment shown, sensor 56 is constructed as a variable inductance sensor that includes a ferrite rod 57 that moves past a stationary coil 58. Rod 57 is mounted to head carriage 48. When head carriage 48 moves, the position of rod 57 relative to coil 58 changes and, therefore, the inductance of coil 58 varies according to the position of carriage 48. While a variable inductance position sensor 56 is shown and described, any suitable position sensor may be used. Other suitable sensors may include, for example, optical sensors and electro-mechanical switching devices.

Loading mechanism 30 is linked to head carriage 48 through a linkage 59 so that head carriage 48 moves in response to movement of loading mechanism 30. In the embodiment shown, linkage 59 includes grabber gear 38 and a lead screw assembly 60. Lead screw assembly 60 includes a lead screw 62 and a follower 64 mounted to lead screw 62. Follower 64 slides up and down along a guide rod 66 at the urging of lead screw 62. A finger 68 projects out from the body 70 of follower 64 to engage a tab 72 on head carriage 48. A gear 74 affixed to the bottom of lead screw 62 engages grabber gear 38.

Figure 9:
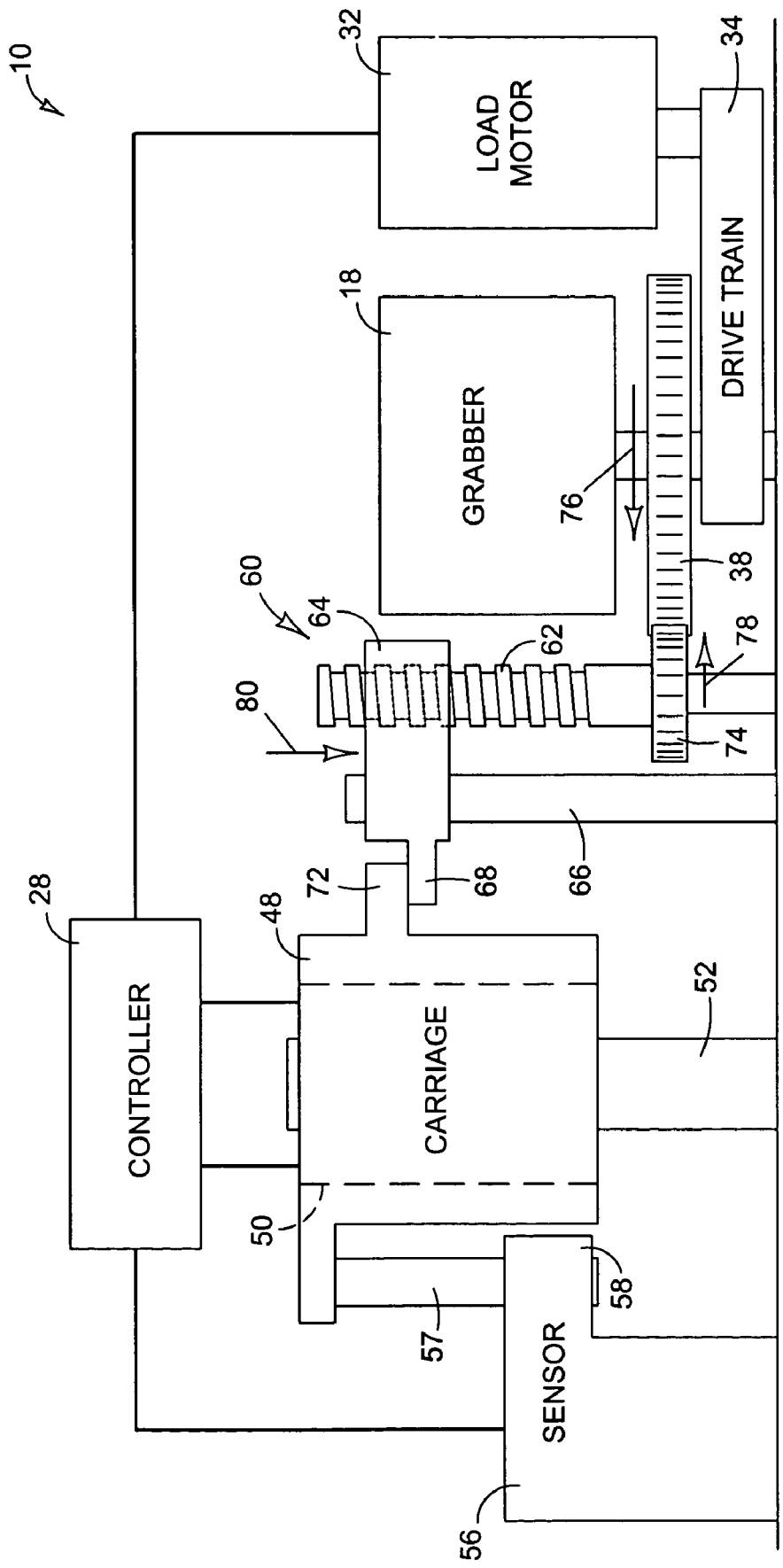
FIG. 9 is an elevation view illustrating the position of the load position sensor of FIG. 8 when a tape cartridge is initially inserted into the tape drive.
Figure 10:
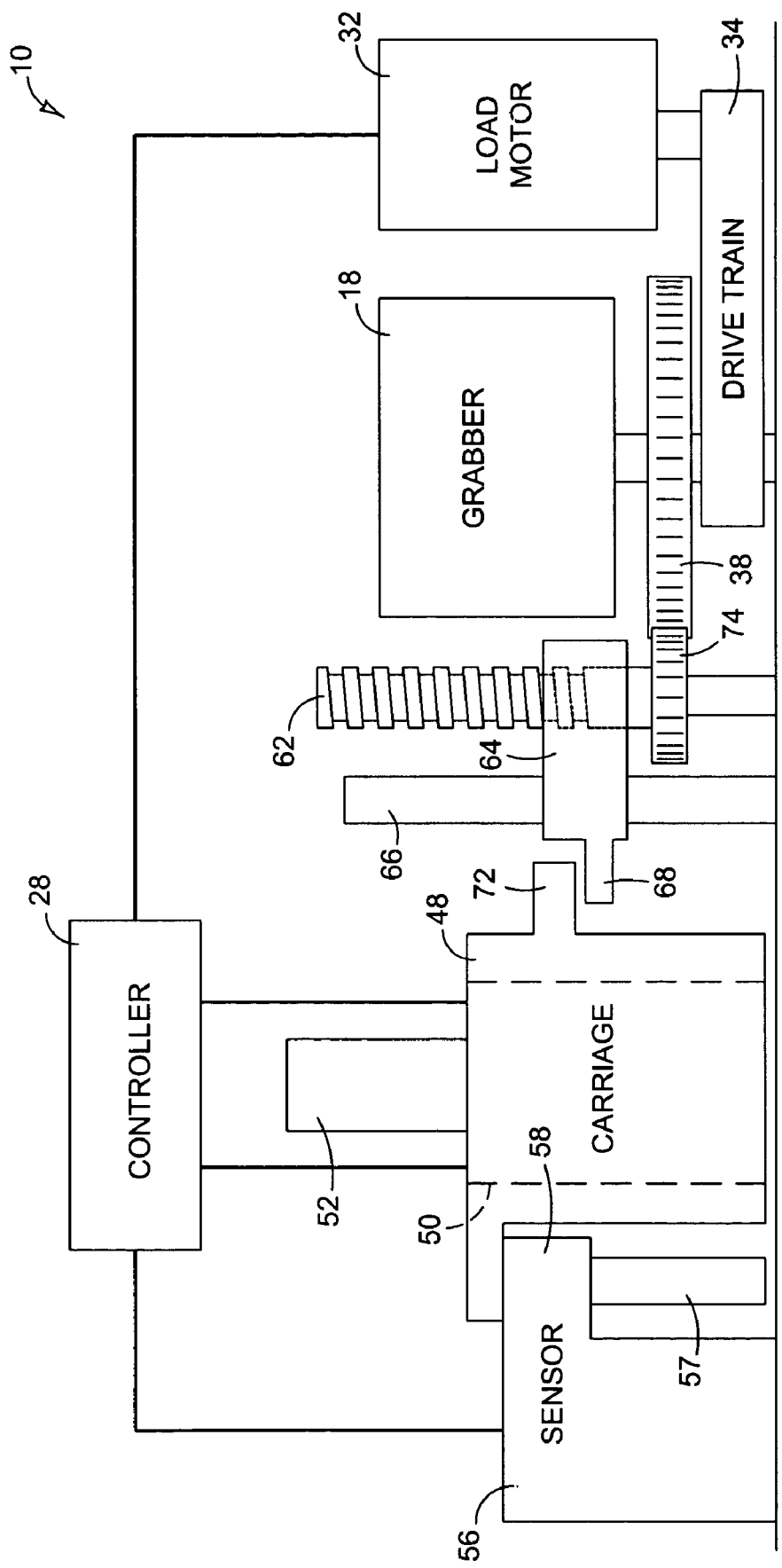
FIG. 10 is an elevation view illustrating the position of the load position sensor of FIG. 8 when a tape cartridge is fully loaded in the tape drive.

FIG. 9 illustrates the location of follower 64 and head carriage 48 when tape drive 10 is empty and at rest. FIG. 10 illustrates the location of follower 64 and head carriage 48 when tray 36 carrying a cartridge 16 is fully loaded into tape drive 10 and pin 40 on the end of tape 12 has been captured. In FIG. 9, follower 64 is located at the top of its range of travel along lead screw 62 and head carriage 48 is supported by follower 64 (through tab 72 and finger 68) at a corresponding raised position. In FIG. 10, follower 64 is located at the bottom of its range of travel along lead screw 62, disengaged from head carriage 48 which is also at the bottom of its range of travel. In the position shown in FIG. 10, head carriage 48 may be driven through a full range of motion by voice coil motor 50 to read and record data on tape 12 unaffected by follower 64.

When a tape cartridge 16 is inserted into tray 36 in drive 10, controller 28 energizes load motor 32 to move, through drive train 34, tray 36 along with cartridge 16 into position next to grabber 18. At the same time, motor 32 is also turning grabber gear 38 through drive train 34. The clockwise rotation of grabber gear 38 rotates lead screw gear 74 counter-clockwise, as indicated by direction arrows 76 and 78 in FIG. 9. The counter-clockwise rotation of lead screw gear 74 and lead screw 62 affixed thereto moves follower 64 down, as indicated by direction arrow 80 in FIG. 9. Although head carriage 48 may be allowed to fall under the force of gravity, it is expected that in most applications head carriage 48 will be biased against finger 68 at the urging of voice coil motor 50. Motor 32 continues to drive grabber gear 38 (through drive train 34) after tray 36 and cartridge 16 are fully loaded into drive 10 to rotate grabber capture part 42 into cartridge 16 to capture pin 40 on the end of tape 12. Once pin 40 is captured, controller 28 stops load motor 32 leaving follower 64 and head carriage 48 at their respective lowered positions shown in FIG. 10.

The sequence is reversed when cartridge 16 is ejected from tape drive 10. Once pin 40 on the end of tape 12 is parked in cartridge 16, controller 28 energizes load motor 32 in reverse to rotate grabber gear 38 counter-clockwise, releasing pin 40 from capture part 42 and rotating capture part 42 out and away from cartridge 16. Motor 32 continues to drive grabber gear 38 counter-clockwise after capture part 42 is clear of cartridge 16 as tray 36 and cartridge 16 are moved away from grabber 18 to the ejected position shown in FIG. 2. The counter-clockwise rotation of grabber gear 38 rotates lead screw gear 74 and lead screw 62 affixed thereto clockwise to move follower 64 and head carriage 48 to the raised position shown in FIG. 9.

Sensor 56 senses the position of head carriage 48 throughout the loading and ejecting operations. The position of head carriage 48 indicates the position of tray 36 and grabber 18 (through follower 64 and gears 74 and 38). Controller 28 is programmed to derive the position of tray 36 and grabber 18 based on the output from sensor 56. By reading the output from sensor 56, controller 28 can monitor and control the progress of the entire loading and ejecting operations using just one sensor. For tape drives in which a sensor 56 is already present, embodiments of the invention have the added benefit of achieving the desired load position sensing using an existing sensor.

Figure 11:
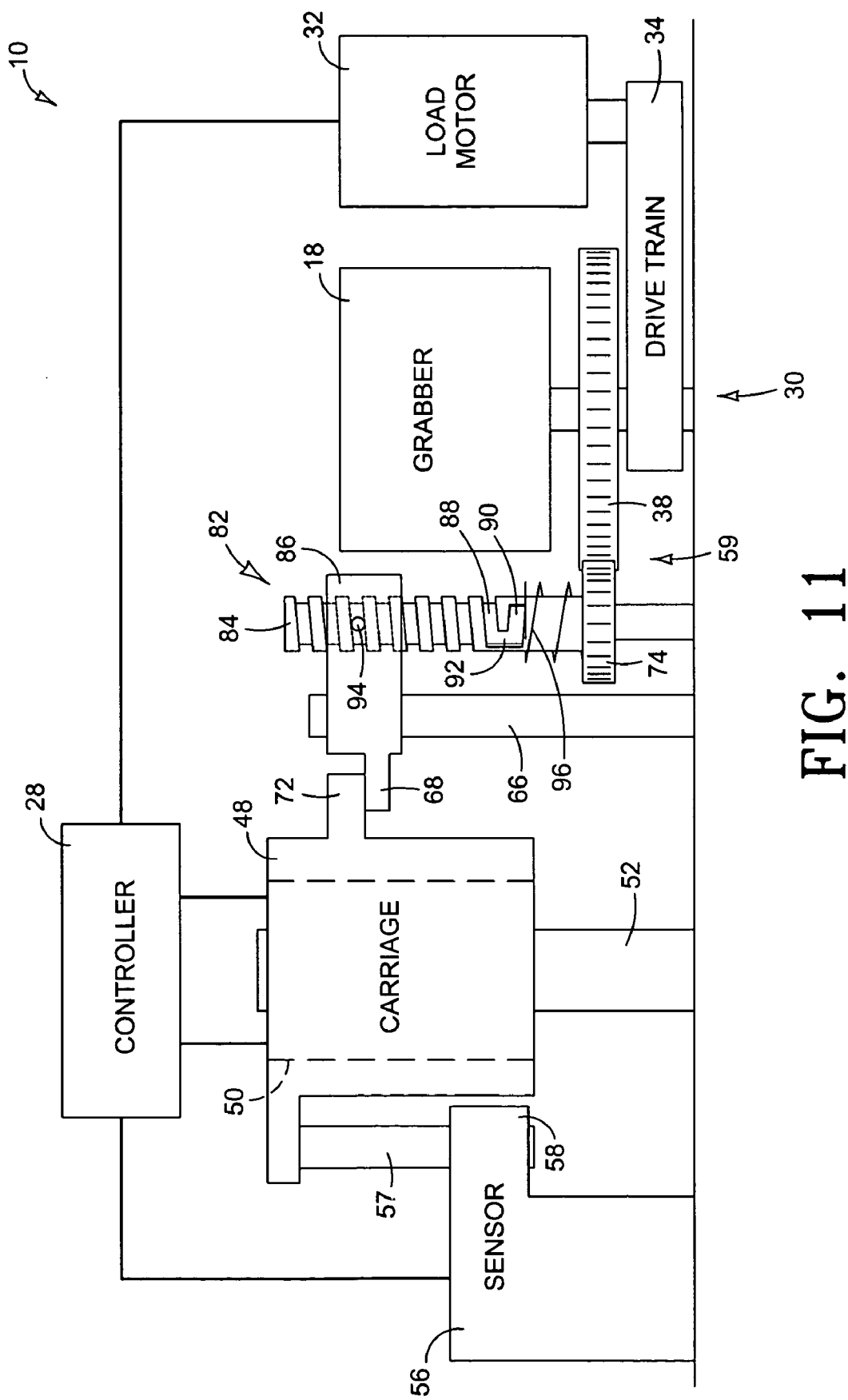
FIGS. 11-13 are elevation views illustrating another embodiment of a load position sensor such as the one shown in FIGS. 2-7 when a tape cartridge is in different load positions.
Figure 12:
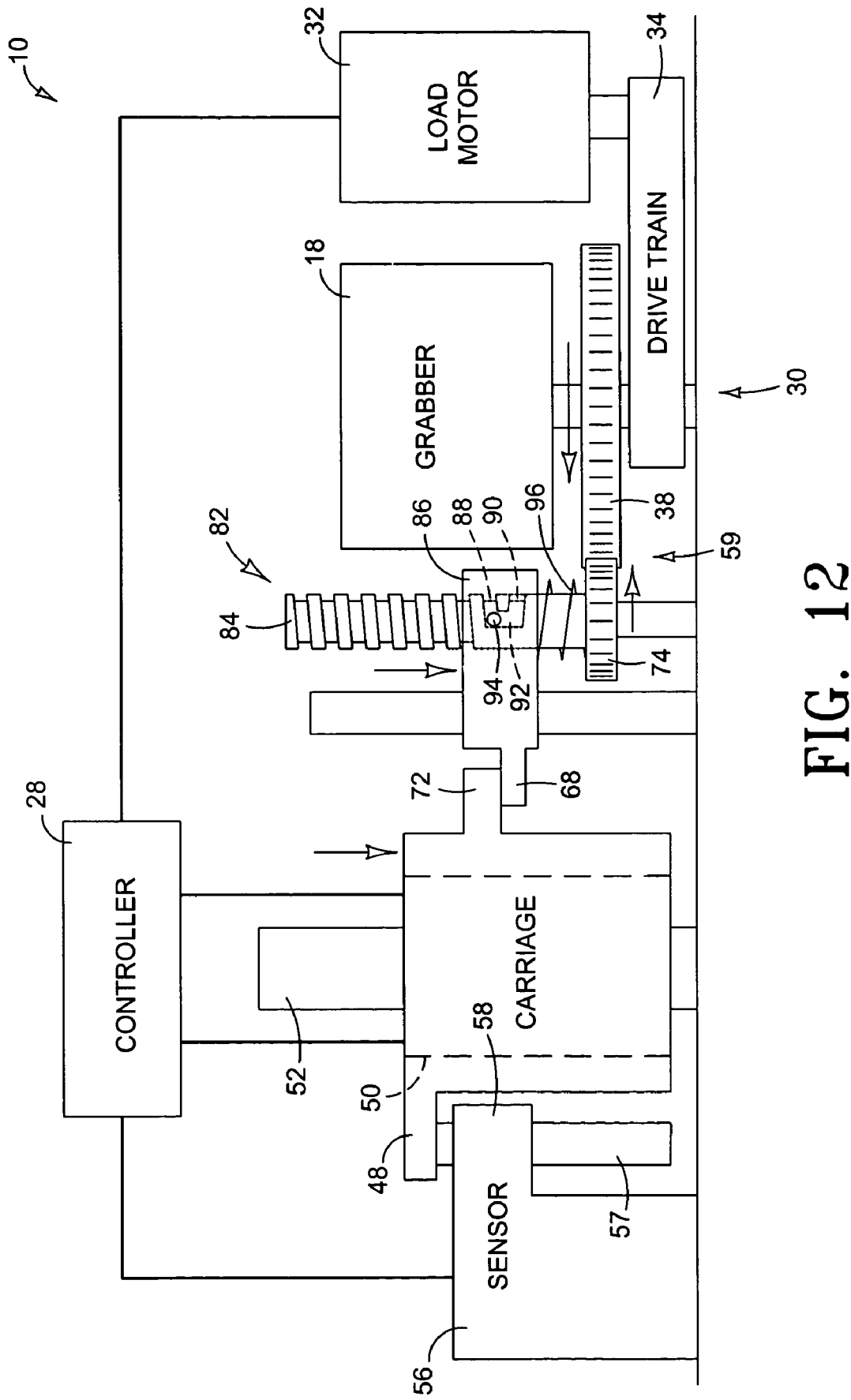
Figure 13:
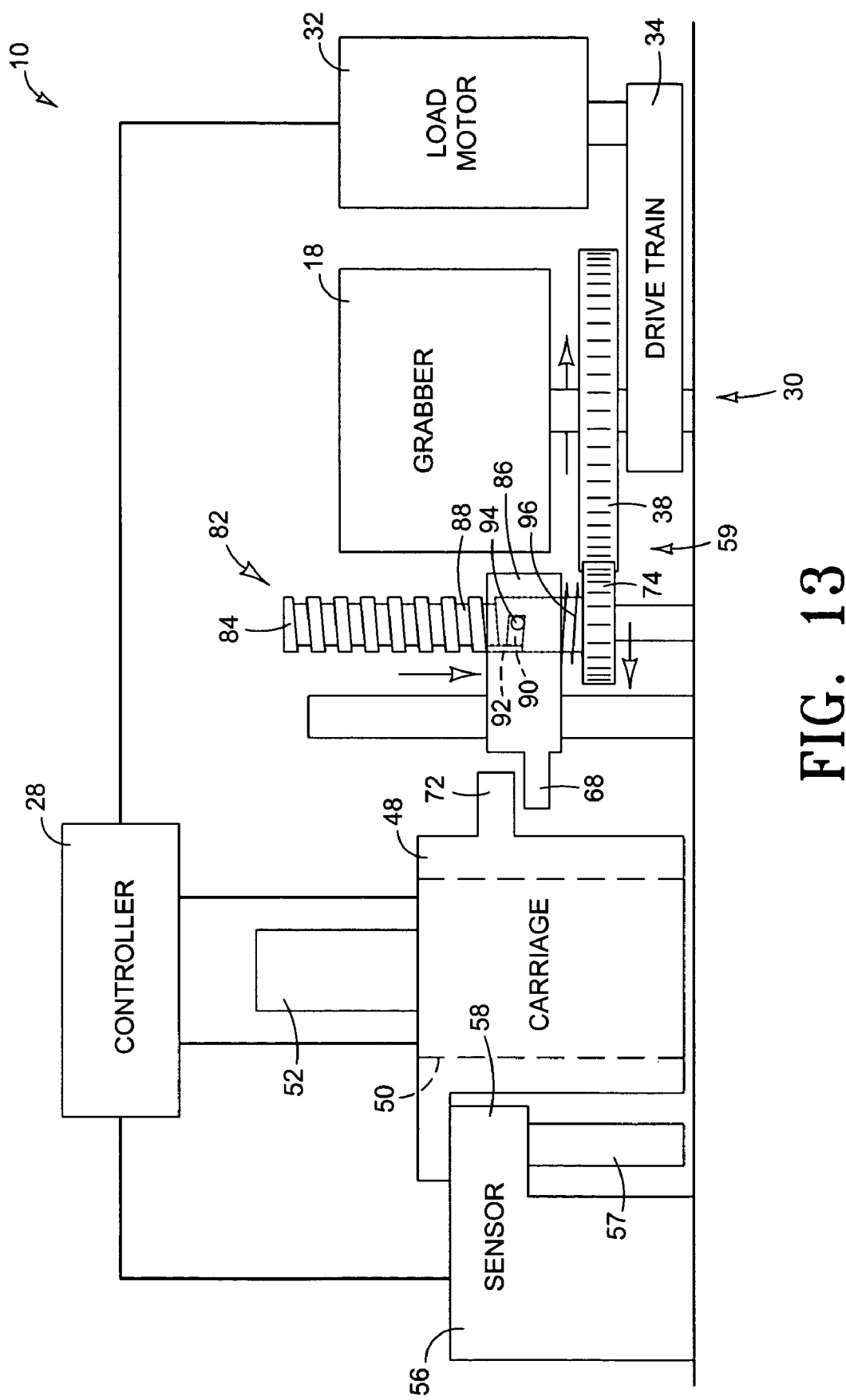
Figure 14:
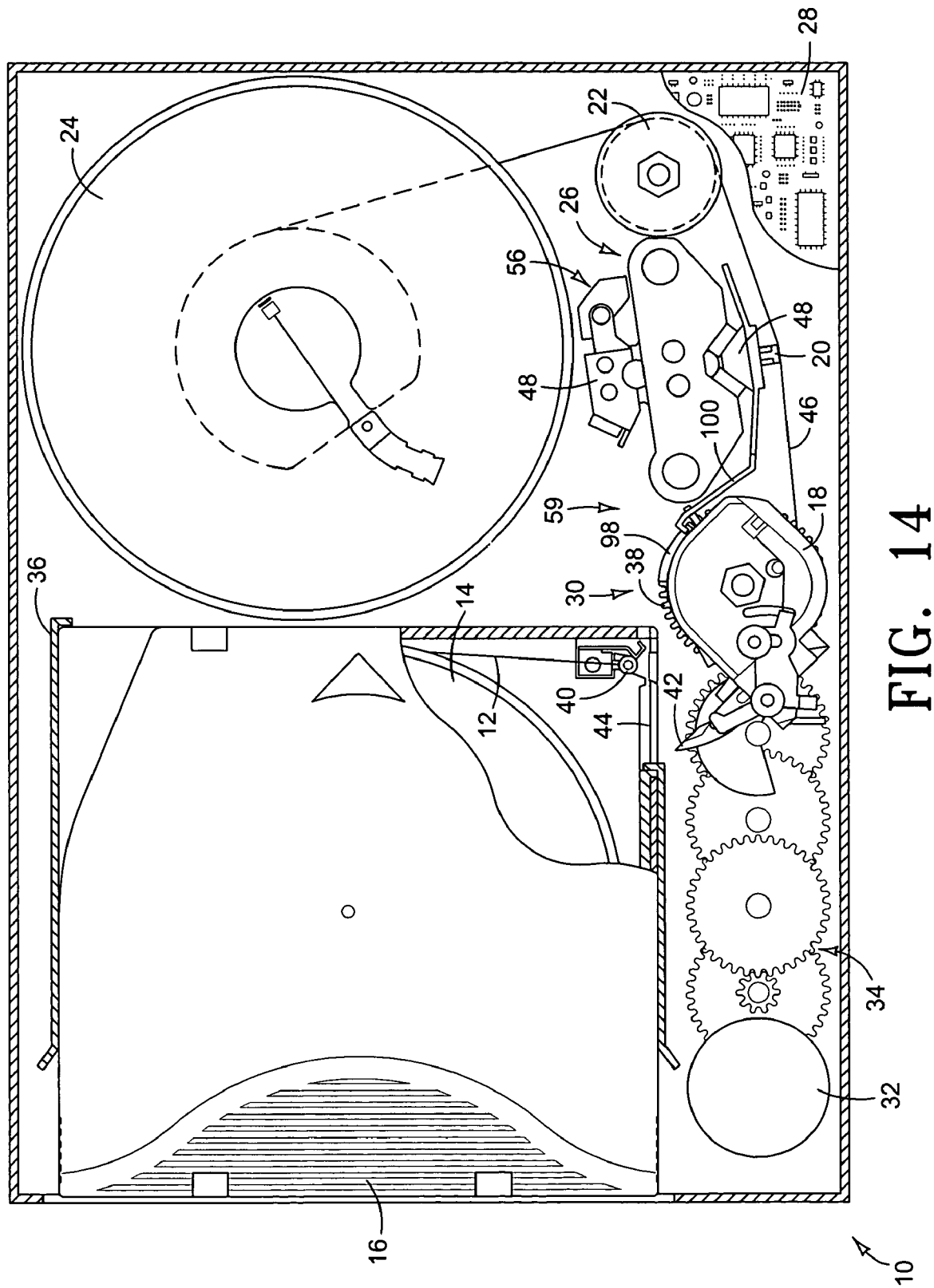
FIG. 14 is a plan view illustrating a tape drive that includes another embodiment of a new load position sensor.
Figure 15:
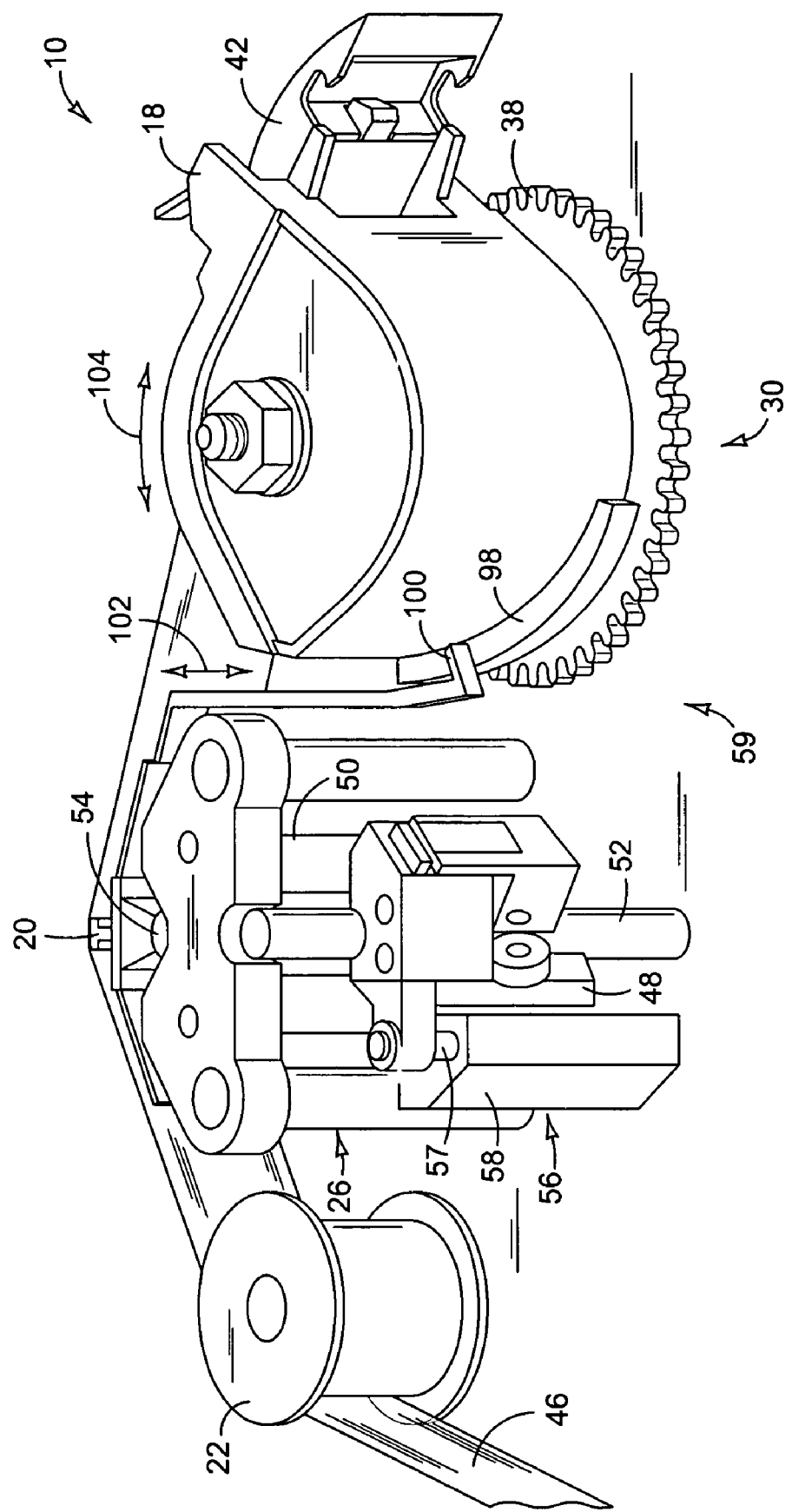
FIG. 15 is a perspective view illustrating the load position sensor of FIG. 14.

In the embodiment shown in FIGS. 11-13, an alternative lead screw assembly 82 is used in linkage 59. In this embodiment, lead screw assembly 82 includes a lead screw 84 and a follower 86. Lead screw 84 includes a forward (right hand) thread 88 extending along the full range of travel of follower 86 during loading and ejecting. Lead screw 84 also includes a short reverse (left hand) thread 90 just below forward thread 88. A vertical slot 92 on lead screw 84 connects forward thread 88 and reverse thread 90. An inwardly projecting stud 94 on follower 86 engages threads 88 or 90 on lead screw 84. A compression spring 96 at the bottom of lead screw 84 biases follower 86 upward near the lower end of its range of travel.

During loading of tape cartridge 16, as described above, when follower 86 reaches the lower end of its operative range of travel, which corresponds to a fully loaded cartridge 16 and pin 40 capture, stud 94 reaches slot 92 as shown in FIG. 12. Then, controller 28 energizes voice coil motor 50 to drive head carriage 48 and follower 86 down, compressing spring 96 and aligning stud 94 with reverse thread 90. Lead screw 84 is then rotated clockwise to capture stud 94 in reverse thread 90 as shown in FIG. 13. The embodiment of lead screw assembly 82 shown in FIGS. 11-13 may be useful if there is any significant backlash in loading mechanism 30. For example, in one design for grabber 18 used in some single reel tape drives, a spring is used to "unwind" grabber 18 a short distance after capturing pin 40 on the end of tape 12. In the lead screw assembly 60 of FIGS. 9-10, the unwinding grabber 18 would raise follower 64 which could limit the travel of head carriage 48. In the lead screw assembly 82 of FIGS. 11-13, an unwinding grabber 18 would rotate lead screw 84 clockwise (through the counter-clockwise rotation of grabber gear 38) to capture stud 94 in reverse thread 90. When ejecting a tape cartridge 16, load motor 32 is first driven forward to "wind" grabber 18 clockwise, rotating stud 94 on lead screw 84 counter-clockwise out of reverse thread 90 and into alignment with slot 92. With the stud 94 in this position, spring 96 decompresses to force stud 94 up into forward thread 88 and the ejection sequence then proceeds as described above.

Figure 16:
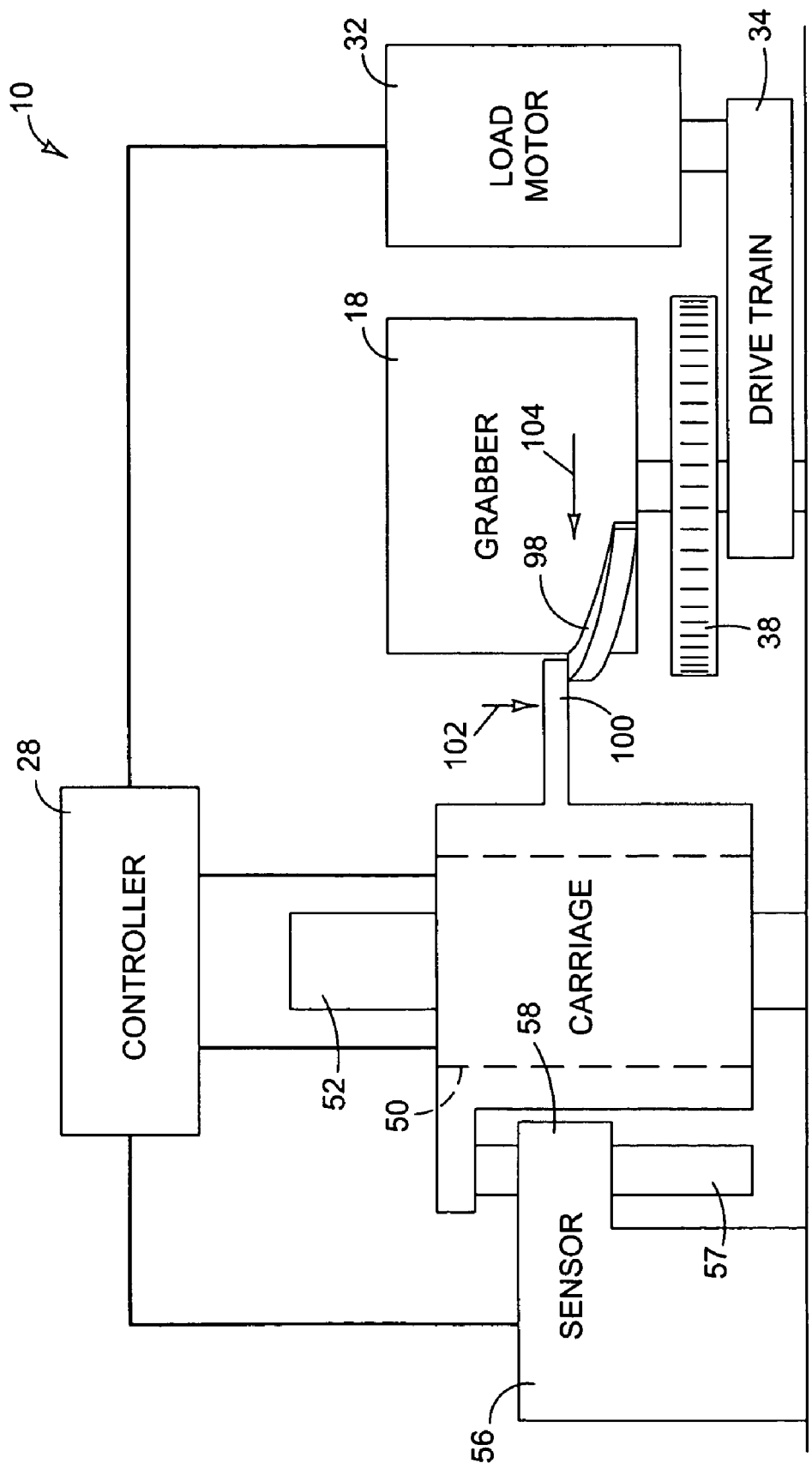
FIG. 16 is an elevation view illustrating the position of the load position sensor of FIG. 15 when a tape cartridge is initially inserted into the tape drive.
Figure 17:
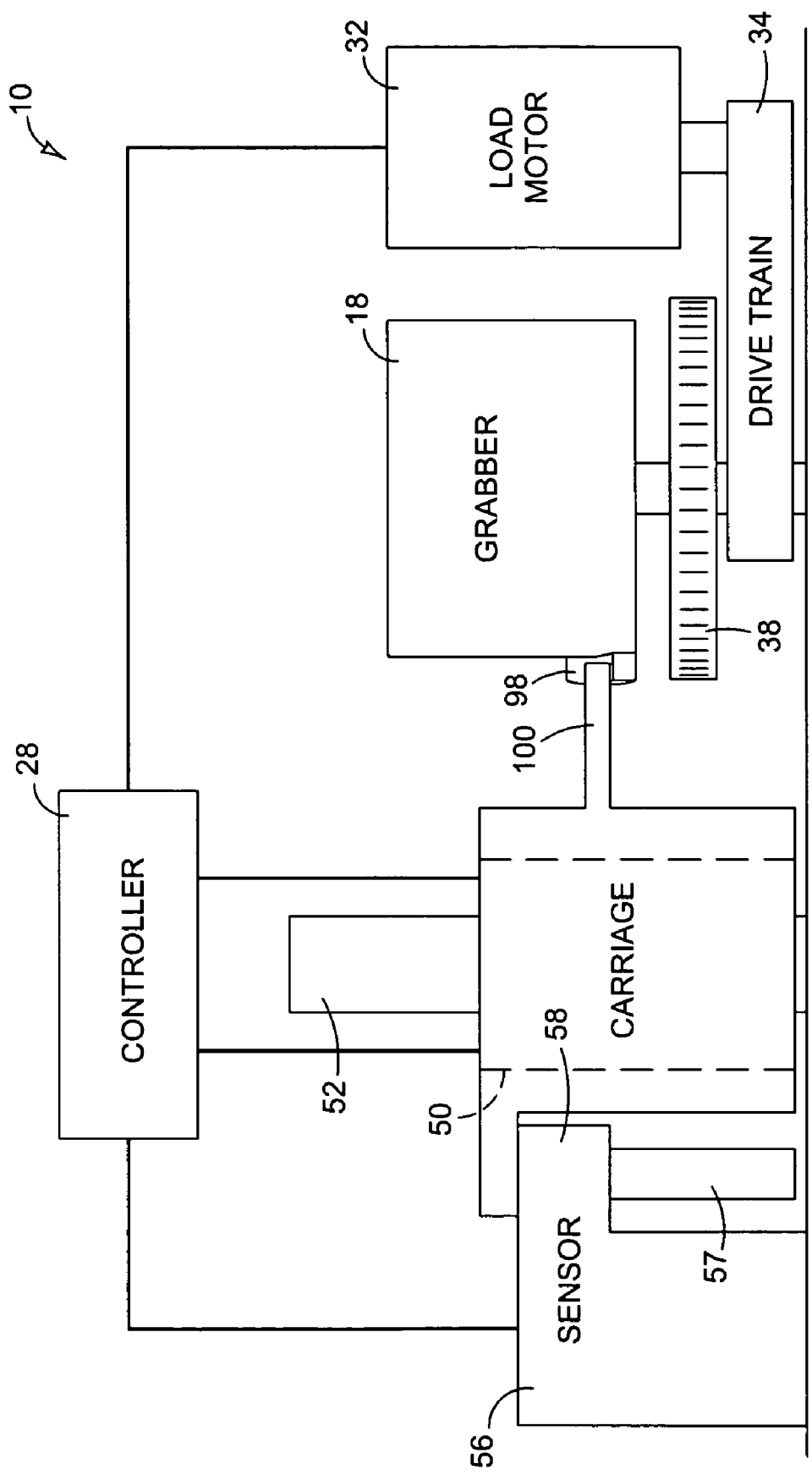
FIG. 17 is an elevation view illustrating the position of the load position sensor of FIG. 15 when a tape cartridge is fully loaded in the tape drive.

In the embodiment shown in FIGS. 14-17, the linkage 59 between loading mechanism 30 and head carriage 48 consists of a helical ramp 98 molded or otherwise affixed to the side of grabber 18. An arm 100 attached to head carriage 48 engages ramp 98. Head carriage 48 moves up and down according to the direction of rotation of grabber 18, as indicated by the direction arrows 102 and 104 in FIG. 15. FIG. 16 illustrates the location of arm 100 on ramp 98 at the upper end of the range of travel, such as might be indicative of an earlier part of a loading operation. FIG. 17 illustrates the location of arm 100 on ramp 98 at the lower end of the range of travel, such as might be indicative of a fully loaded cartridge 16 and pin 40 capture.

The exemplary embodiments shown in the figures and described above illustrate but do not limit the invention. Other forms, details, and embodiments may be made and implemented. Hence, the foregoing description should not be construed to limit the scope of the invention, which is defined in the following claims.

What is claimed is:

1. A position sensor for a tape drive, comprising:
a tape cartridge loading mechanism;
a head moved in response to movement in the loading mechanism; and
a sensor operatively coupled to the head for sensing a position of the head throughout at loading and ejecting operations of a tape, wherein movement of the head induces a change in inductance in the sensor and a position of the loading mechanism is determined based on feedback from the sensor.

2. A position sensor for a tape drive, comprising:
a tape cartridge loading mechanism;
a head carriage moved in response to movement in the loading mechanism; and
a sensor operatively coupled to the head carriage for sensing changes in inductance to determine a position of the head carriage throughout entire loading and ejecting operations of a tape, wherein a position of the loading mechanism is determined based on feedback from the sensor.

3. The sensor of claim 2, wherein the head carriage is translatable in response to rotation in the loading mechanism.

4. A position sensor for a tape drive having a movable head carriage and a tape cartridge loading mechanism, the position sensor comprising:
a sensor operatively coupled to the head carriage for sensing a position of the head carriage; and
a mechanical linkage linking the loading mechanism and the head carriage wherein a position of the loading mechanism is determined based on feedback from the sensor and the linkage comprises a ramp affixed to a rotatable part of the loading mechanism and an arm having one part riding on the ramp and another part attached to the head carriage.

5. A tape cartridge loading mechanism, comprising:
a movable tray configured to hold a tape cartridge;
a rotatable tape threading unit disposed adjacent to the tray;
a motor drivingly coupled to the tray and the threading unit through a drive train;
a movable carriage;
a sensor operatively coupled to the carriage for sensing the position of the carriage; and
a linkage linking the threading unit and the carriage such that the carriage is movable in response to rotation of the threading unit, wherein the linkage comprises a ramp affixed to a rotatable part of the loading mechanism and an arm having one part riding on the ramp and another part attached to the head carriage.

6. A tape drive, comprising:
a tape cartridge loading mechanism that includes a linkage having a ramp affixed to a rotatable part of the loading mechanism and an arm having one part riding on the ramp and another part attached to the head carriage;
a take-up reel;
a head;
an actuator including a carriage carrying the head, the carriage movable in response to movement in the loading mechanism and the actuator operative to move the head in a direction generally perpendicular to a direction a tape travels past the head during read and record operations;
a tape path extending past the head to the take-up reel;
a sensor operatively coupled to the carriage for sensing the position of the head carriage; and
an electronic controller configured to receive read and record instructions and data from a computer or other host device, to derive a position of parts of the loading mechanism based on feedback from the sensor, and to control operation of the loading mechanism, the take-up reel, the actuator and the head.

7. The tape drive of claim 6, wherein the loading mechanism comprises:
a movable tray configured to hold a tape cartridge;
a rotatable tape threading unit disposed adjacent to the tray;
a motor drivingly coupled to the tray and the threading unit; and
wherein the head carriage is movable in response to rotation of the threading unit.

8. The tape drive of claim 6, wherein the loading mechanism comprises:
a movable tray configured to hold a tape cartridge;
a rotatable tape threading unit disposed adjacent to the tray;
a motor drivingly coupled to the tray and the threading unit through a drive train; and
the linkage linking the threading unit and the head carriage such that the head carriage is movable in response to rotation of the threading unit.

9. A position sensing method for a tape drive having a movable head carriage and a tape cartridge loading mechanism, the method comprising:
moving the loading mechanism;
the head carriage moving in response to moving the loading mechanism; and
sensing multiple positions of the head carriage during an entire tape cartridge loading and ejecting operations, wherein movement of the head carriage induces a change in inductance used to determine a position of the loading mechanism.

10. A method, comprising:
mechanically linking a tape drive cartridge loading mechanism and a head carriage;
moving the loading mechanism to load a cartridge into the tape drive;
moving the head carriage in response to moving the loading mechanism; and
continuously sensing a position of the head carriage while the cartridge is being loaded into and ejected from the tape drive, wherein movement of the head carriage induces a change in inductance used to determine a position of the loading mechanism.

* * * * *

UNITED STATES PATENT AND TRADEMARK OFFICE
CERTIFICATE OF CORRECTION

PATENT NO. : 7,283,318 B2  
APPLICATION NO. : 10/877641  
DATED : October 16, 2007  
INVENTOR(S) : Ted A. Brooks et al.

It is certified that error appears in the above-identified patent and that said Letters Patent is hereby corrected as shown below:

In column 5, line 16, in Claim 1, after "throughout" delete "at".

Signed and Sealed this

Fifth Day of August, 2008

JON W. DUDAS  
*Director of the United States Patent and Trademark Office*